No. 834,587. PATENTED OCT. 30, 1906.
H. A. MOYER.
TAG FOR LIVE STOCK.
APPLICATION FILED MAR. 31, 1906.

*Fig.8.*  *Fig.7.*  *Fig.6.*

Witnesses: Inventor:

UNITED STATES PATENT OFFICE.

HARVEY A. MOYER, OF SYRACUSE, NEW YORK.

TAG FOR LIVE STOCK.

No. 834,587.    Specification of Letters Patent.    Patented Oct. 30, 1906.

Application filed March 31, 1906. Serial No. 309,172.

*To all whom it may concern:*

Be it known that I, HARVEY A. MOYER, a citizen of the United States, residing at Syracuse, in the county of Onondaga and State of New York, have invented a new and useful Improvement in Tags for Live Stock, of which the following is a specification.

This invention relates to marking-tags for live stock; and the object of the invention is to produce a tag that can be made at little cost, that can be applied without special tools, and that cannot be easily detached.

A more particular object is to make and apply the tag in a way to lessen the danger of its being accidentally torn out of the animal's ear as compared with the tags heretofore used.

Figure 1:
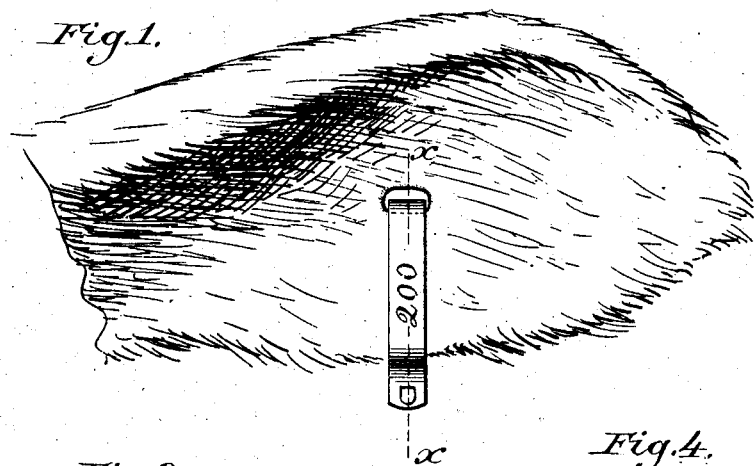
Figure 2:
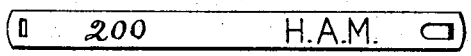
Figure 3:
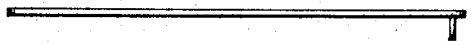
Figure 4:
Figure 5:
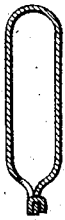
Figure 5:
Figure 5:
Figure 5:
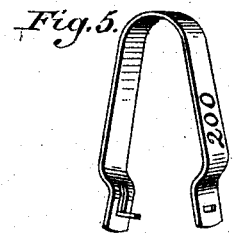

In the accompanying drawings, consisting of one sheet, Figure 1 is an elevation of an animal's ear with my improved tag in position. Fig. 2 is a plan of the tag as it comes from the dies by which it is made. Fig. 3 is a view of one edge of the tag corresponding with that shown in Fig. 2. Fig. 4 is a view showing one edge of the tag ready for use. Fig. 5 is a perspective view of the same. Fig. 6 is an edge view of the tag as applied to the ear before being locked therein. Fig. 7 is a view similar to that shown in Fig. 6, showing a pair of pliers as applied to lock the tag. Fig. 8 is a section on line X X, Fig. 1, showing the tag as locked in position.

This tag is made by suitable dies from a strip of non-corrosive metal. One end has a simple oblong opening and the other a projecting clench-point formed by cutting its sides and one end from the central part of the tag, as shown in Fig. 2, and bending it down, as shown in Fig. 3.

The initials or name of the owner and numerals denoting a number for registration are preferably stamped on the tag, either before or after the operation of forming the clench-point, but may be done at the same time, if desired, and the final operation consists in bending the tag to the form shown in Fig. 4.

The ear of the animal is usually pierced with a hollow punch that removes a portion of the ear, leaving when healed an oblong opening, as shown in Fig. 1, and this is preferably done before the tag is applied in order that the wound may heal before its application; but the ear may be pierced with any implement that will form a slot in the central part of the ear, and the tag may be applied at the time the ear is pierced, if preferred.

The tag, as shown in Fig. 4, is applied by passing the end with the opening through the ear and then bending the central part of the tag so as to cause the clench-point to project through the opening in the opposite end of the tag, as shown in Fig. 6, and then with an ordinary pair of pliers the clench-point is easily closed down to lock the tag in position, as shown in Fig. 8.

It should be observed that the two ends of the tag are of uniform length and curvature or offset alike, so as to cause their inner sides to meet on the center line of the tag, and that they are locked in close contact just under the lower edge of the ear. Particular attention is called to the fact that the clench-point extends downwardly or away from the ear and that it rests snugly against the parallel ends of the tag in a way to prevent the clench-point from being caught by the hoof of the animal or any other object that may come in contact with the tag.

While it is desirable that a tag of this nature be easy to apply, it is more important that it be hard to detach, this for the reason that each tag should identify the animal to which it is applied for life. By the peculiar construction of the tag herein described I provide a nearer permanent means of identification than has been made heretofore.

As seen in Fig. 1 and Fig. 8, the clench-point is short, and consequently hard to straighten after having once been locked in position, and it should be understood that the clench-point closely fits the opening in the end of the tag, so that the act of clenching the point also upsets it slightly or enough to cause it to act as a rivet as well as a clench-point and hold the ends of the tag securely together even after the point may have been bent back as nearly straight as possible.

I claim as my invention—

1. A tag for live stock consisting of a single piece of metal having its central part bent to U shape, and its ends inwardly offset to meet face to face on the center line of the tag, the ends being of the same outward form and united by an integral clench-point projecting from the center of one end through a central opening in the other end, substantially as set forth.

2. A tag for live stock consisting of a single piece of metal having its central part bent to U shape, and its ends offset to meet on the center line of the tag, the ends being of the same length and outward form and connected by an integral projection from the center of one end passing through the center of the other end and having its projecting end bent down in a direction away from the body of the tag, substantially as set forth.

3. A tag for live stock consisting of a single piece of metal having its straight ends offset and its center bent to form a loop and locate the offset ends on the center line of the loop, the ends being of equal length and the same outward form, and having an integral central projection from one end passing through a central opening in the other end, said projection being upset in said opening and having its outer end bent down in a direction away from the loop against the end of the tag, substantially as set forth.

Witness my hand, this 8 thday of February, 1906.

HARVEY A. MOYER.

Witnesses:
E. G. LATTA,
FRANK E. REID.